United States Patent [19]

Buehner

[11] 4,241,934
[45] Dec. 30, 1980

[54] ANTI-JACKKNIFE DEVICE FOR TRACTOR-TRAILER COMBINATION

[76] Inventor: Joseph F. Buehner, 6750 State Rd., Wadsworth, Ohio 44281

[21] Appl. No.: 972,255

[22] Filed: Dec. 22, 1978

[51] Int. Cl.³ .............................................. B62D 53/08
[52] U.S. Cl. ...................................................... 280/432
[58] Field of Search ........................................ 280/432

[56] References Cited

U.S. PATENT DOCUMENTS

| 3,895,827 | 7/1975 | Padrick | 280/432 |
| 3,989,268 | 11/1976 | Rawn | 280/432 |
| 4,120,514 | 10/1978 | Sanders | 280/432 |

Primary Examiner—John J. Love
Assistant Examiner—R. Schrecengost
Attorney, Agent, or Firm—John Harrow Leonard

[57] ABSTRACT

The anti-jackknife device is installable on a tractor-trailer combination in which the tractor and trailer are detachably connected by a fifth wheel assemblage without any modification in the fifth wheel assemblage. The device includes a stop lug mounted on the underside of the trailer in fixed lateral and endwise position relative thereto, but for movement upwardly and downwardly into and out of engagement, respectively, with a limit stop mounted in fixed position on the tractor. When the lug and stop are interengaged, they permit free relative rotation of the tractor and trailer about the turning axis of the fifth wheel within certain limits extending a few degrees in each direction beyond a median position wherein the tractor and trailer are aligned for straight line travel. The lug and limit stop are spaced a material distance from the fifth wheel and from the turning axis so that the fifth wheel structure, its mounting, and the frame of the tractor are relieved from resisting severe turning moments tending to rotate the tractor and trailer beyond the turning limits imposed by the lug and limit stop and, instead, are subjected to shearing stresses directed generally laterally of the turning axis. The stop lug may be movable downwardly and upwardly by reversible fluid pressure operated motors to which the fluid pressure is supplied from the tractor. The supply is controlled remotely from the cab of the tractor so that the lug and stop can be moved to inoperative position when necessary for effecting sharp turns and for maneuvering in spaces of close clearance.

8 Claims, 19 Drawing Figures

ANTI-JACKKNIFE DEVICE FOR TRACTOR-TRAILER COMBINATION

BACKGROUND OF INVENTION (1) Field of Invention

Anti-jackknife device for tractor-trailer combinations.

(2) Prior Art

Heretofore anti-jackknife devices have been provided for tractor-trailer combinations. In general, in these prior structures, the tractor fifth wheel and its mounting must withstand severe turning moments imposed in resisting any tendency of the tractor and trailer to jackknife.

The conventional fifth wheel is one having a bearing plate with a central socket, with a cut-out in the plate leading into the socket and having guide edges divergent outwardly of the plate and which operate to guide the connecting pin on the trailer radially into the socket. Such fifth wheels have jaws which can be swung, selectively, out of locking position at the rear of the socket to permit the pin to enter radially into the socket, and into locking position behind the pin to retain it in the socket.

Prior anti-jackknife devices customarily are arranged with an element on the trailer which can be shifted selectively to a position to interpose a turn limiting lug on the trailer between the guiding edges on the fifth wheel, so that, upon relative turning of the tractor and trailer about the connecting pin beyond a predetermined degree, the lug engages one or the other of the guide edges of the fifth wheel and thereby limits the relative rotation or degree of turn of the tractor and trailer about the connecting pin.

Thus all of the stresses of the turning moments imposed in preventing jackknifing are resisted by reactive turning moments of the fifth wheel structure and its mounting. These stresses opposing turning moments by the fifth wheel about the connecting pin axis are at a relatively short radius from the turning axis, this radius being limited in length, at maximum, to the maximum radius of the fifth wheel bearing plate itself.

SUMMARY

In the present invention, the anti-jackknife device is one in which the stresses imposed by the tendency of the tractor and trailer to jackknife beyond a predetermined relatively rotated position about the turning axis, are distributed between the fifth wheel and a supplemental interlock operating at the end of a much greater radius about the turning axis of the fifth wheel. The structure is such that it relieves the fifth wheel and its mounting from appreciable turning moments and instead subjects it to lesser and laterally directed shearing stresses.

Various other objects and advantages of the invention will become apparent from the following description wherein reference is made to the drawings.

PREFERRED EMBODIMENT OF THE INVENTION

Figure 1:
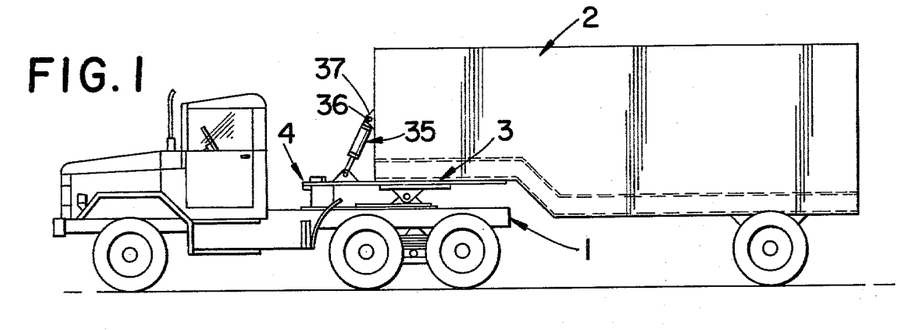
FIG. 1 is a diagrammatic fragmentary side elevation of a tractor-trailer combination with the anti-jackknifing device of the present invention installed thereon.
Figure 2:
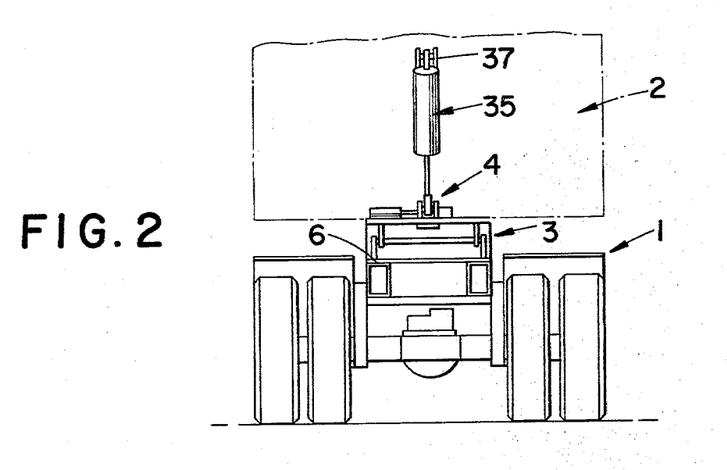
FIG. 2 is a rear end elevation of the structure illustrated in FIG. 1.

Referring first to FIG. 1, a tractor 1 is shown as connected to a trailer 2 by means of a conventional fifth wheel structure, designated generally at 3, the vehicles being shown in the normal lineal traveling position relative to each other. Relative rotation or turning of the tractor and trailer about the turning axis of the connecting pin and socket of the fifth wheel mechanism is limited by an anti-jackknife device, indicated generally at 4.

Figure 3:
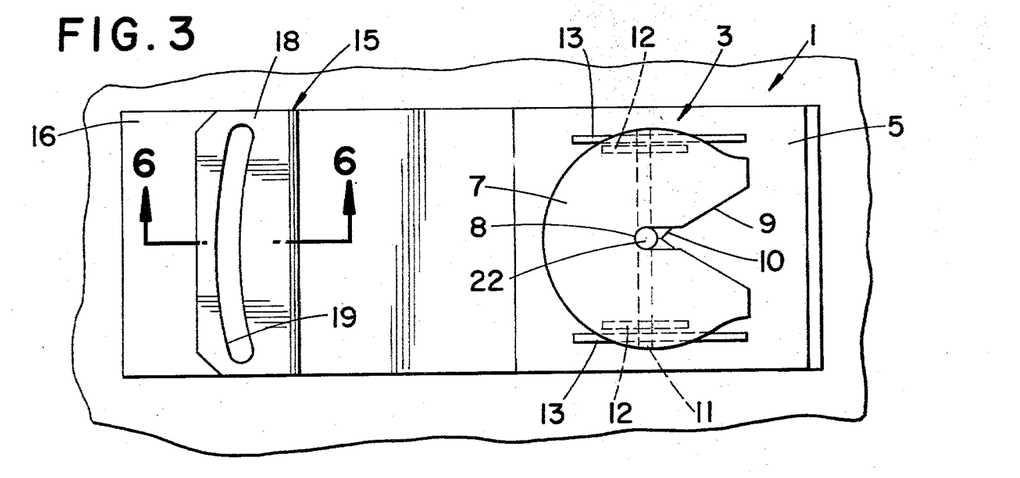
FIG. 3 is a fragmentary top plan view of a tractor with a conventional fifth wheel, and provided with one part of the anti-jackknifing device of the present invention.
Figure 4:
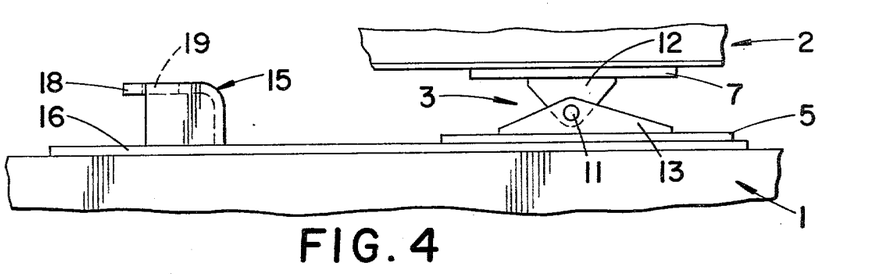
FIG. 4 is a side elevation of the structure illustrated in FIG. 3.
Figure 5:
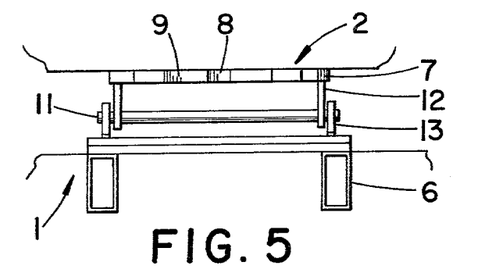
FIG. 5 is a right end elevation of the structure illustrated in FIGS. 3 and 4.

Referring more specifically to FIGS. 3 through 5, the conventional fifth wheel structure 3 comprises a supporting or connecting plate 5 which is securedly bolted or otherwise connected to the frame or beams 6 of the tractor in fixed position thereon. Mounted on the plate 5 is a fifth wheel bearing plate 7 having a central socket 8 to which access of a connecting pin is afforded through outwardly divergent guide edges 9 of a cut-out in the plate 7. Conventional locking jaws 10, which may be of any of the usual types, are provided for latching pin in the socket for rotation relative to the plate 7. The plate 7 is rockably supported by a suitable transverse shaft 11 which extends through aligned holes in brackets 12 on the underside of the plate 7 and holes in companion brackets 13 mounted on the supporting plate 5.

All of the fifth wheel structure thus described is conventional except that, in some instances, the brackets 13 may be mounted directly on the beams 6 or frame of the tractor instead of on the intermediate connecting or supporting plate 5.

The present anti-jackknifing device employs a limiting stop on the tractor. In the form illustrated, this stop, indicated at 15, may be mounted on a common base plate 16 which is secured fixedly on the tractor frame and which also may support the fifth wheel supporting plate 5, thus providing an extremely rigid one piece structure in which the limiting stop 15 and the fifth wheel structure 3 can be preset at the manufacturing site and subsequently installed as a unit on the tractor.

Figure 6:
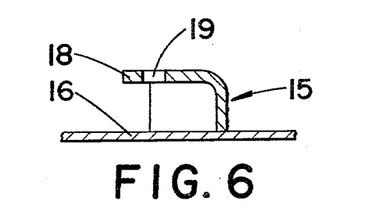
FIG. 6 is an enlarged fragmentary sectional view taken on the line 6—6 in FIG. 3.

The limit stop 15 is a rigid structure, which may be boxlike and open at the bottom and have a top wall 18 with a transverse slot 19 thereon. The top wall 18 is arranged so that its upper face is coplanar with the upper face of the fifth wheel bearing plate 7 when the upper surface of the bearing plate 7 is in horizontal position. The slot 19 preferably is curvilinear and concentric with the socket 8 of the fifth wheel. This stop 15 functions to limit the relative turning or rotation of the tractor and trailer about the turning axis of the fifth wheel.

Figure 7:
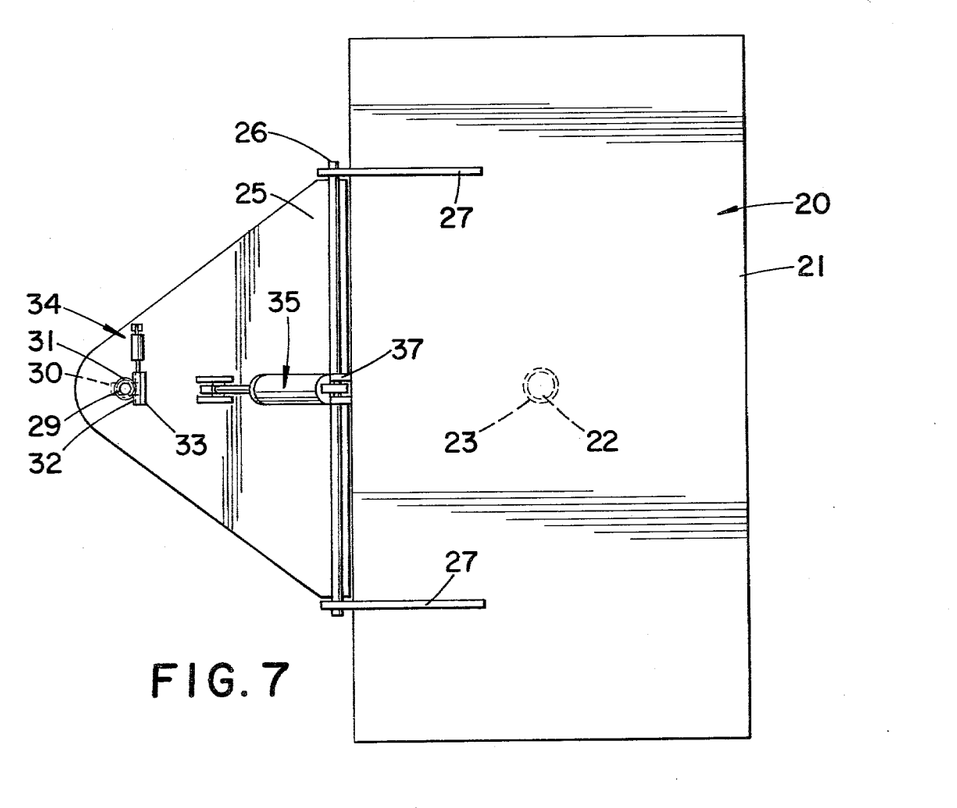
FIG. 7 is a top plan view of a complementary part of the anti-jackknife device, which part is carried on the underside of the trailer.
Figure 8:
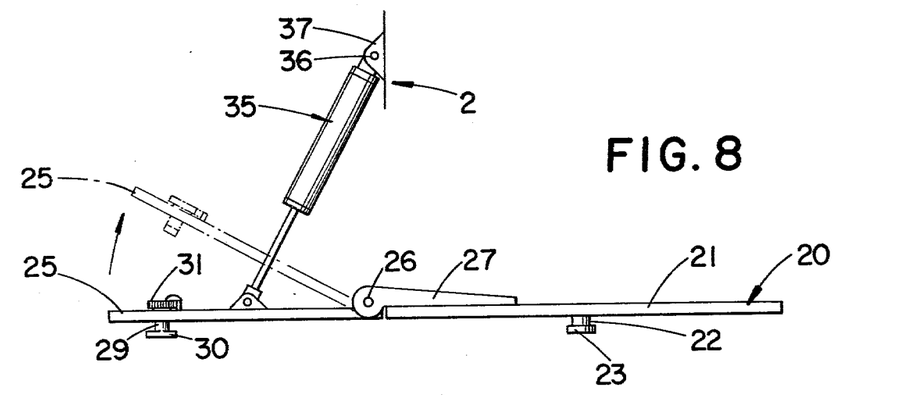
FIG. 8 is a side elevation of the structure illustrated in FIG. 7.
Figure 9:
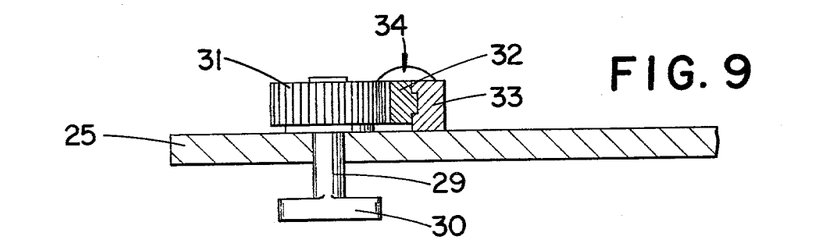
FIG. 9 is an enlarged fragmentary side elevation of a portion of the structure illustrated in FIG. 7, and showing an interlocking pin which cooperates with the element shown in FIG. 6.

For cooperation with the fifth wheel structure 3, a a complementary fifth wheel structure 20 is provided and is mounted in fixed position on the underside of the trailer. This complementary fifth wheel structure comprises generally a large bearing plate 21 sufficiently large and of such shape that it bears against the entire upper face of the fifth wheel bearing plate 7 in all turned positions of the tractor and trailer.

The plate 21 carries a depending connecting pin 22 having an enlarged head 23. The pin is received radially in the socket 8 by a movement of the tractor and trailer toward each other while the plates 7 and 21 are in bearing relation, the pin being guided into the socket by the inwardly converging guide edges 9 of the bearing plate 7. The enlarged head 23 is spaced a distance below the plate 21 such that it can snugly engage the under margins of the plate 7 defining the socket 8 and thereby prevent vertical separation of the pin 22 from the socket.

This structure functions in the conventional manner, the pin being restrained from radial movement out of the socket by conventional means, such as the jaws 10, after being thus received in coaxial relation therein.

In order to effect the anti-jackknifing interlock of the tractor and trailer, a locking tongue 25 is connected to the plate 21, for rocking upwardly and downwardly about a horizontal axis, by a transverse shaft 26. In the form illustrated, the tongue 25 is in the form of a triangular plate having its base adjacent the forward edge of the plate 21. The tongue 25 is is secured to the shaft 26, the ends of which extend beyond the lateral edges of the plate and are received in suitable aligned holes in brackets 27 mounted on the top of the plate 21. At its forward end, the tongue 25 carries a limit lug 29 which can be lowered between the side walls of the slot 19 when the tongue 25 is swung downwardly to a position in which its underface is generally coplanar with the underface of the plate 21. With the limit plug 29 in the slot 19, upon relative rotation or turning of the tractor and trailer about the connecting pin 22, the lug 29 travels along the slot 19. The lug 29 has a T-head 30 and is mounted rotatably in the tongue 25. Its upper end extends above the tongue 25 and is provided with a pinion 31. The pinion 31 is engaged by a driving rack 32 which is buttressed by a guide 33 for endwise movement by a piston and cylinder assemblage 34. The assemblage can be operated hydraulically or by air remotely from the cab by conventional flexible hoses and valve connections which connect it to a fluid pressure source on the tractor. The lug can be rotated by the rack and pinion so that the T-head 30 is parallel to the slot 19 when the tongue 25 is lowered to operating position and therefore can enter the slot 19 until the T-head 30 passes beneath the undersurface of the top wall 18. Thereupon, the piston and cylinder assemblage 34 is operated to actuate the rack and pinion and thereby rotate the lug 29 to position the T-head 30 crosswise of the slot 19, thus preventing the lug from being lifted out of the slot accidentally.

Figure 11:
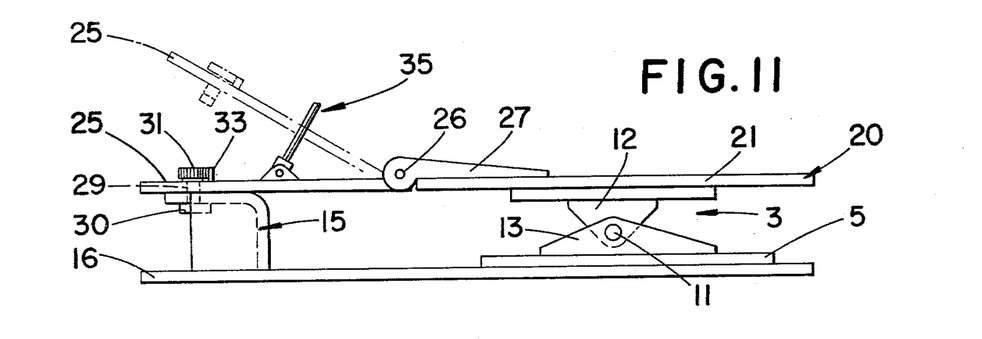
FIG. 11 is a side elevation of the structure, as illustrated in FIG. 8, but showing a different operating position of the elements thereof.

Generally, the tongue 25 is lifted and lowered by a suitable hydraulic or air piston and cylinder assemblage 35 which is pivotally connected by a pivot 36 to a suitable bracket 37 on the front end or some other portion of the trailer. This assemblage 35 also can be operated remotely from the cab.

If desired, the piston and cylinder assemblages 34 and 35 may be interconnected so that the piston 34 operates to turn the lug 29 and dispose the T-head 30 crosswise of the slot 19 only after the assemblage 35 has been operated to lower the tongue 25, and to require that the assemblage 34 rotate the lug 29 to turn the T-head 30 lengthwise of the slot 19 before the assemblage 35 can operate to lift the tongue.

Figure 10:
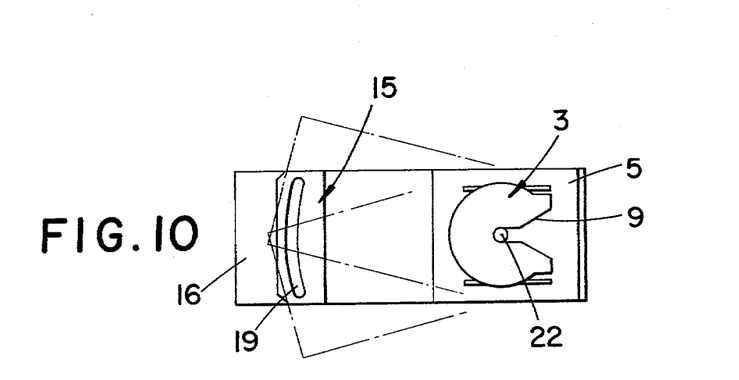
FIG. 10 is a top plan view of the structure illustrated in FIGS. 3 and 7, showing them in superposed operating relation, parts of each being broken away for clearness in illustration.

As mentioned, the slot 19 is an arc concentric with the axis of the socket 8 and the connecting pin 22. Thus the lug 29 can swing freely along the slot 19 from one end to the other, depending upon the angular relation to which the tractor and trailer have been turned or rotated about the turning axis of the fifth wheel.

Figure 12:
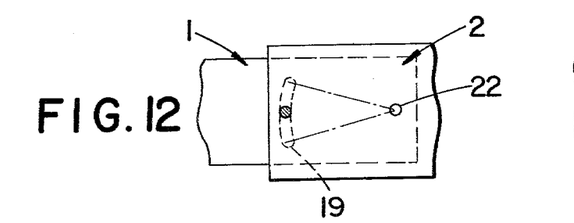
FIG. 12 is a diagrammatic plan view showing the relation of the tractor and trailer and the parts of the anti-jackknife device, in normal aligned traveling condition of the tractor and trailer.
Figure 13:
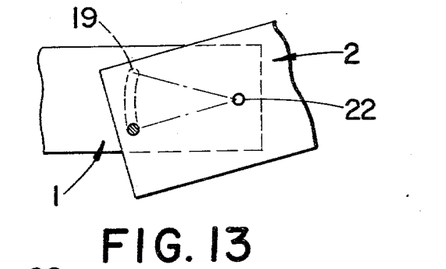
FIG. 13 is a diagrammatic plan view similar to FIG. 12 and showing the maximum angular departure, from the normal aligned traveling condition, to which the device limits the tractor and trailer in one direction of turning.
Figure 14:
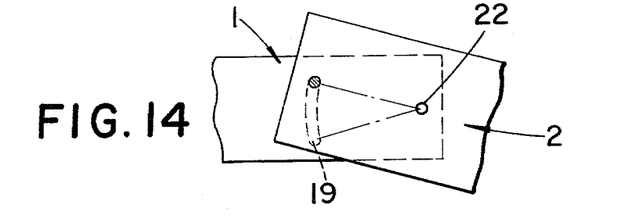
FIG. 14 is a diagrammatic plan view, similar to FIGS. 12 and 13, but showing the maximum angular departure to which the device limits the tractor and trailer in the opposite direction of turning.

Preferably the length of the slot 19 is such that the total angle through which the tractor and trailer can rotate relative to each other, when the lug 29 is in place in the slot 19, is 30°, this being 15°s to each side of the normal centered position in the slot in which position the tractor and trailer are positioned for travel in a straight line. This maximum permitted angularity may be varied somewhat dependng upon the usual site of operation of the tractor-trailer combination. It is found, however, that the 15° swing or turn in each direction beyond the straight ahead position is adequate for main throughways and most of the primary state highways. Such a range also permits the tractor and trailer combination to turn corners if both intersecting roads or streets are wide so as to permit a wide turning radius. However, in general, the trailer and tractor are moving at a relatively slow speed when negotiating sharp curves or abrupt turns and hence any tendency to jackknife can be corrected by bracking of the tractor and trailer by the operator so that there is little danger of jackknifing, which occurs generally when the tractor or trailer start skidding when traveling at relatively high speeds whereat braking is not an adequate control.

With the present structure, in case of a sharp turn required, the operator merely operates the piston and cylinder assemblage 34 to rotate the pin 29, and then the piston and cylinder assemblage 35 to lift the tongue 25, thus disconnecting the lug 29 of the anti-jackknife device from the stop 15, thereby leaving the tractor and trailer free for relative turning or rotation to any angle desired; for example, for backing into bays of freight terminals, or negotiating narrow passageways between buildings or sharp turns on narrow streets.

A distinct advantage of the present invention is that the turning moment of the tractor and trailer about the turning axis of the fifth wheel is resisted by forced applied to the lug 29 by the stop 15 and thus at the end of a very long lever arm from the connecting pin 22. This is such that the fifth wheel plate 7 and its supporting brackets 12 and 13 and, in fact, the frame of the tractor and trailer are not subjected to the severe turning moments and stresses imposed as would be the case were a limiting lug, such as the lug 29, positioned to engage between the guide edges 9 to limit the relative turning or rotation. In the case of prior devices, not only would the fifth wheel structure 3 itself and the adjacent tractor frame have to resist all turning moments imposed in prior structures but also the resultant stresses would be extremely severe due to the short radius through which the resisting forces had to be applied to the lug on the trailer.

With the present structure, the stop lug 29 is about three feet from the axis of the connecting pin 22 and thus can resist severe turning moments at a much less stress on the stop 15 and fifth wheel. At the same time, the fifth wheel structure 3 is subjected substantially only to shearing stresses directed laterally of the tract and hence transversely of the axis of the socket 8.

In normal travel the lug 29 is moved into the slot 19 and so remains, thus guarding against jackknifing at the relatively high speeds at which the tractor and trailer normally travel on the main highways. It is removed only when the operator of the tractor has slowed down in order to make some abrupt turn or to maneuver in tight spaces.

Referring to FIGS. 15 to 19, the device is basically the same in function as the form illustrated in FIGS. 1-14. However, it happens in some instances where the tractor-trailer must travel over a surface having abrupt extreme changes in grade contour, such as railroad grade crossings, steeply inclined loading ramps, elevated culverts, and the like, that means must be provided for maintaining the limit lug on the trailer and the limit stop on the tractor from disengaging or binding. The modified form of the device is adapted to assure proper functioning under these severe conditions, as well as under the more modest conditions under which the structure heretofore described functions.

Figure 15:
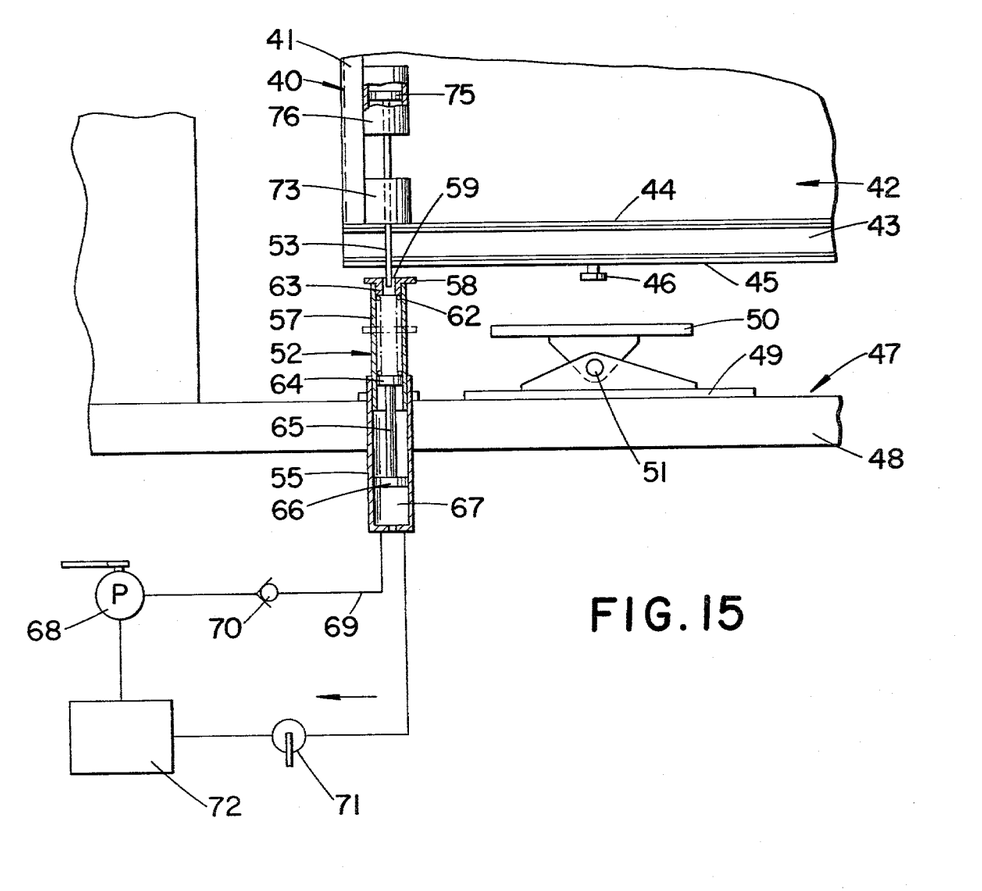
FIG. 15 is a fragmentary side elevation, partly in section, illustrating a modified form of the invention.

As illustrated in FIG. 15, the trailer, designated generally at 40, as a forward upright frame 41 and a generally horizontal bed frame 42 which includes longitudinal elements 43 and internal flooring 44. A bearing plate 45 is connected to the underside of the frame 42 adjacent the front end of the trailer and carries a conventional connecting pin 46 for engagement with the fifth wheel on the tractor. The tractor, indicated generally at 47, has a horizontal frame 48 on which is mounted, either directly or on a plate 49 which, in turn, is mounted on the frame, a conventional rocking fifth wheel 50 which rocks about the axis of a cross shaft 51.

The structure thus far described is the same as the basic structure heretofore described in connection with FIGS. 1 through 14.

In order to provide an anti-jackknifing limit stop mechanism, there is mounted on the tractor frame 48 a limit stop, designated generally at 52, which cooperates with a limit lug 53 carried by the trailer.

Figure 16:
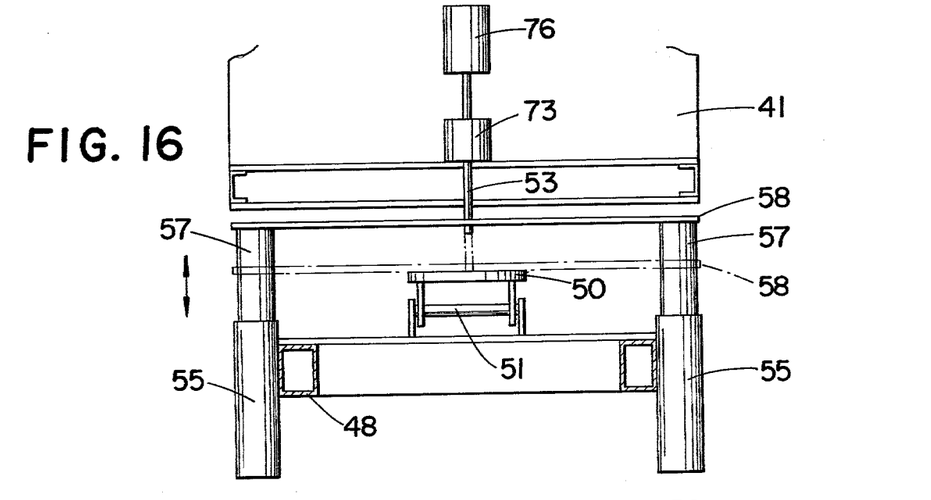
FIG. 16 is a right end elevation of the structure illustrated in FIG. 15.
Figure 17:
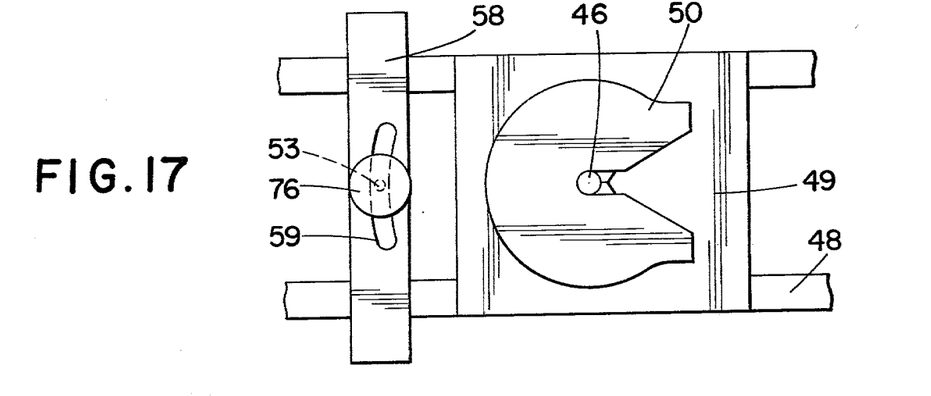
FIG. 17 is a top plan view of the structure illustrated in FIG. 15, the trailer structure being omitted for clearness in illustration.

The limit stop 52 comprises a pair of upright cylinders 55 mounted in fixed position endwise on the tractor and in laterally spaced relation to each other. Mounted for reciprocation in the cylinders 55 are hollow cylinders 57, respectively, which at their upper ends carry a comon stop member 58. The member 58 has a limit slot 59 therein, the slot extending generally transversely of the tractor and being curved about the center of the connecting pin socket 60 of the fifth wheel.

Disposed within each assemblage of cooperating cylinders 55 and 57 is a compression spring 62 which, at its upper end, bears against a suitable abutment 63 in the cylinder 57 on the underside of the plate 58. The lower end of the spring rests on a movable support 64 in the cylinder 55. The movable support 64 is carried on a piston rod 65 connected to a piston head 66 which operates in a cylinder 67.

Suitable pressure fluid, either hydraulic or air, is supplied from a suitable source, such as a hand pump 68, to both cylinders 67, through suitable hose lines 69 so as to force the piston heads 66 and the movable supports 64 upwardly when desired. The pressure fluid is retained in the cylinders 67 by means of a check valve 70 and a manually operable return stop cock 71, and a storage tank 72 of adequate capacity and disposed between the intake of the pump and the stop cock 71.

Figures 18, 19:
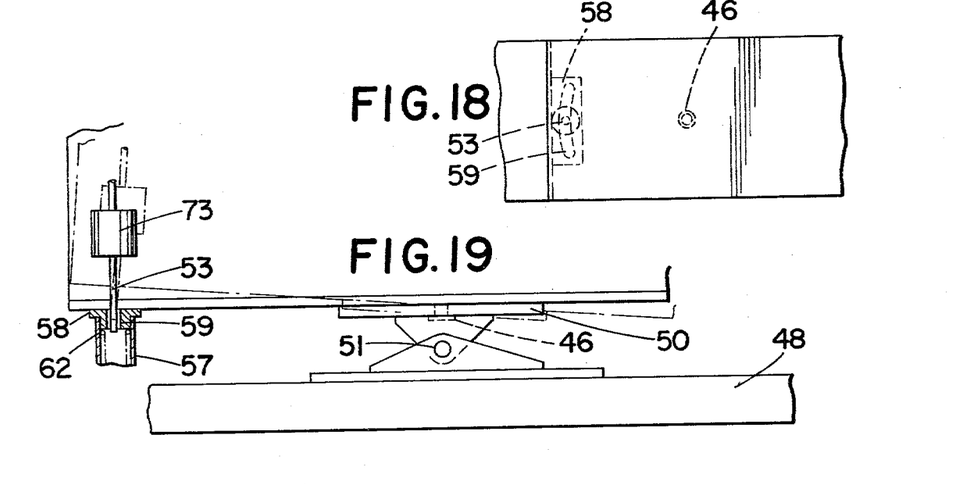
FIG. 18 is a fragmentary top plan view of a portion of the device which is mounted on the forward end of the trailer, part of the trailer being indicated.
FIG. 19 is a diagrammatic illustration showing two operating positions illustrating the functioning of the modified form of the device.

When, by admission of pressure fluid into the cylinders 67, the piston heads 64 are raised, they compress their associated springs 62 and thereby resiliently lift the limit stop member 58 to an elevated position relative to the tractor frame. The amount of lift is sufficient to raise the stop member 58 to, or closely adjacent to, the underface of the plate 45 on the bottom of the trailer, even when the tractor and trailer are in coupled condition or being coupled, or at an extreme rocked position about the axis of the rock shaft 51 of the fifth wheel, as best indicated in FIG. 19.

Mounted fixedly in the trailer adjacent its front wall is a suitable upright guide sleeve 73 in which the limit lug 53 is guided for vertical reciprocation. The sleeve 73 is open at the bottom so that the lug 53 can be engaged in the slot 59 of the stop member 58 in all relatively rocked positions of the tractor and trailer about the axis of the shaft 51. Also, this arrangement assures entry of the lug 53 into the slot 59 through a wide angle of relative rotation of the tractor and trailer about the axis of the fifth wheel connecting pin 46.

The lug 53 is raised and lowered selectively by means of a piston 75 operating in hydraulic or air cylinder 76. If desired, the lug may be the rod of the piston 75. The piston 75 may be manually controlled remotely from the cab of the tractor through suitable hose connections and valves. Thus, even in a relatively extreme rocked position of the fifth wheel 50 and an abrupt angular relation between the tractor and trailer relative to lineal alignment of the two, the lug 53 is assured of entry into the slot 59 as the trailer is lowered so that its front end swings downwardly. As it does so, the limit stop 58 is engaged by the bottom of the plate 45 on the trailer and is moved downwardly therewith so that the lug 53 cannot misalign with the slot 59 as the tractor and trailer are connected for operation on the highway. In normal conditions on a relatively level highway, the upper surface of the stop member 58 is coplanar with both the underface of the plate 45 and the top surface of the fifth wheel 50.

This modified structure also has the advantage that the limit stop member 58 and lug 53 can be disposed between the limited space fore and aft afforded in most tractor-trailer combinations. In general, the distance of the front of the trailer from the rear of the cab is about 20 inches and from the front of the trailer to the turning axis of the fifth wheel socket is about 35 inches. The radius of the fifth wheel is generally about 15 inches, except for the rearward guide extensions which guide the connecting pin 46 into the central socket 60 of the fifth wheel.

With this structure, therefore, the lug 53 can be disposed very closely adjacent the front of the trailer and the limit stop 58 similarly located so that the turning moments imposed by engagement of the lug 53 with the ends of the slot 59 are at the end of a lever arm of about 32 to 33 inches from the axis of the connecting pin 46. If an additional lever arm is necessary, the guide sleeve 73 and cylinder 76 and lug 53 can be mounted on the forward end of the trailer, and the limit stop 58 and its supporting cylinders 55 can correspondingly be moved farther away from the turning axis of the fifth wheel. As a result of this structure, assurance that the stop lug 53 will enter properly into the slot 59 in all relatively rocked positions of the tractor and trailer about the rocking axis 51 of the fifth wheel and in a wide range of turned positions about the turning axis of the connecting pin 46 is assured. Further, during travel, the limit stop 58 can rise and fall as necessary to maintain its engagement with the underside of the plate 45 and the lug 53 substantially at, or close to, the bottom of the forward end of the trailer.

In order to compensate for the slight movement of the lug 53 radially of the slot due to rocking about the axis of the shaft 51, the slot 59 may be made slightly wider than the diameter of the lug 53.

Another advantage of both forms of the invention is a partial distribution of the tractor load between the fifth wheel and the locking lug. Generally, fifth wheels are mounted in rubber blocks or between springs which permit limited movement of the fifth wheel endwise of the tractor. Such mountings act as shock absorbers in starting and stopping. In taking up the slack in the fifth wheel mounting, the limit lug can engage the rearward edge of its slot and provide part of the tractive force, thus relieving the fifth wheel from part of the load.

Having thus described my invention, I claim:

1. An anti-jackknife device for a tractor-trailer combination in which a tractor member and trailer member are connected for turning relative to each other about a turning axis by a fifth wheel connection including a rockable bearing plate; mounting means supporting the rockable bearing plate on said one member for rocking about a fixed axis extending transversely of said one member, and said rockable bearing plate having a socket;

a complementary bearing plate and a connecting pin on the other member, said pin being rotatable in the socket while the bearing plates are in load bearing relation, the improvement comprising:

a first limit stop element separate from, and unconnected to, both said rockable bearing plate and said mounting means;

means for connecting the first limit stop element to said one of the members independently of, and in spaced relation, radially of said turning axis, to both said rockable bearing plate and said mounting means;

a complementary limit stop element;

support means for connecting the complementary limit stop element to the other member in a predetermined position for engagement with, and cooperation with, the first limit stop element in a manner to permit limited turning of the members in opposite directions relative to each other about said turning axis from an intermediate position in which the tractor and trailer members would be aligned for lineal travel and to arrest said turning of the members in opposite directions beyond a predetermined degree of turning out of said intermediate position, said support means further connecting said complementary limit stop element for movement, selectively, into and out of said predetermined position; and operating means for moving said complelimit stop elements, selectively, into and out of said predetermined position.

2. The device according to claim 1 wherein remotely controlled power means are drivingly connected to said operating means for operating the operating means.

3. A device according to claim 1 wherein said first limit stop element has a pair of abutments spaced apart from each other;

said complementary limit stop element is disposed, when in said intermediate location, between said abutments and is spaced from both of them when the elements are mounted on the members, respectively, and the members are aligned endwise for lineal travel and are pivotally connected by the fifth wheel connection, and said complementary limit stop element is operative, upon rotation of the members, in each of opposite directions, a predetermined distance beyond said intermediate position, to engage said abutments, respectively, depending upon the direction of rotation of the members and thereby to limit relative rotation of the members in said last mentioned direction of rotation.

4. A device according to claim 1 wherein said support means is mountable on its associated one of said members for moving toward and away from the plane of the bearing face of the one of the bearing plates on its associated member, and thereby for moving the complementary limit stop element into and out of said operative position relative to the first limit stop element, selectively.

5. A device according to claim 4 wherein the support means are arranged to be pivotally supported on its associated one of the members for swinging about a fixed axis parallel to the bearing face of the bearing plate on said associated one of the members.

6. The combination with a tractor unit and a trailer unit, a rockable fifth wheel member on one unit and having a bearing face, a connecting pin receiving socket, spaced guides extending from the rear of the fifth wheel member and leading into said socket, and mounting means connecting the rotatable fifth wheel member to said one unit for rocking about a fixed axis extending transversely of said one unit;

a second fifth wheel member on the other unit and having a complementary load bearing face;

a connecting pin on said other unit and which can be guided into the socket by the guides, when the bearing faces are in contact, by backing the tractor unit relative to the trailer unit for thereby connecting the units for relative rotation about the turning axis of the connected pin and socket;

a first limit stop element; supporting means mounting said element on said one unit independently of, and spaced radially of said turning axis from, and unconnected with, both said rockable fifth wheel member and its mounting means; and having stop abutments spaced from each other circumferentially of said turning axis;

a complementary limit stop element having stop abutments; supporting means connecting said complementary limit stop element to the other of said units with its said abutments in a predetermined position for engagement and cooperation with the abutments of the first limit stop element in a manner to permit limited turning of the units in opposite directions relative to each other about said turning axis from an intermediate position in which the units would be aligned for lineal travel, and to arrest said turning of the units in opposite directions beyond a predetermined degree of turning out of said intermediate position;

said supporting means of one of said elements supporting its associated element on its associated unit for movement therewith about the turning axis of the fifth wheel members in an operative path in which the abutments of one of the elements are out of engagement with the abutments of the other of the elements when the units are in aligned position for lineal travel and one of the abutments on one of said elements engages one of the abutments on the other of said elements, depending on the direcof turning of the units, and the engaged elements limit the relative rotation of the units about said turning axis when the units are rotated relative to each other in either direction a predetermined angle beyond said aligned position.

7. The combination according to claim 6 wherein said second fifth wheel member is a rigid plate mounted in fixed position on said other unit and having a planar bearing face, said supporting means is a rigid element mounted near one edge of said rigid plate; pivot means connect the supporting element to said other unit for swinging of the supporting element toward and away from the plane of said bearing face; and said cooperable anti-jackknife means include means depending from the supporting element and carried thereby into and out of said operative path.

8. The combination according to claim 6 wherein the anti-jackknife means on said one unit are in fixed position relative thereto; and the cooperable anti-jackknife means on the other unit are movable into and out of said operative path.

* * * * *

UNITED STATES PATENT AND TRADEMARK OFFICE
CERTIFICATE OF CORRECTION

PATENT NO. : 4,241,934

DATED : December 30, 1980

INVENTOR(S) : Joseph F. Buehner

It is certified that error appears in the above-identified patent and that said Letters Patent are hereby corrected as shown below:

Col. 3, line 5, before "pin" read --the--.
line 26, for "thereon" read --therein--.
line 35, cancel "a" (first occurrence.)
line 64, cancel "is" (first occurrence.)

Col. 5, line 13, for "forced" read --forces--.
line 34, for "tract" read --tractor--.
line 44, for "function" read --functions--.

Col. 6, line 13, for "comon" read --common--.
line 56, after "in" read --a--.

Col. 8, line 22, for "complelimit" read --complementary limit--.
line 64, for "rotatable" read --rockable--.

Col. 10, line 7, for "direcof" read --direction of--.

Signed and Sealed this

Fourteenth Day of April 1981

[SEAL]

Attest:

RENE D. TEGTMEYER

Attesting Officer    Acting Commissioner of Patents and Trademarks